United States Patent
McMillen

(10) Patent No.: US 7,425,036 B2
(45) Date of Patent: *Sep. 16, 2008

(54) COMFORT BELT SPRING PULLEY

(75) Inventor: Robert J. McMillen, Tecumseh (CA)

(73) Assignee: Schukra of North America, Ltd., Lakeshore-Tecumseh, Ontario (CA)

( * ) Notice: Subject to any disclaimer, the term of this patent is extended or adjusted under 35 U.S.C. 154(b) by 251 days.

This patent is subject to a terminal disclaimer.

(21) Appl. No.: 11/209,944

(22) Filed: Aug. 23, 2005

(65) Prior Publication Data

US 2007/0063561 A1 Mar. 22, 2007

(51) Int. Cl.
*A47C 7/46* (2006.01)
(52) U.S. Cl. ............... 297/284.4; 297/284.8; 297/284.9
(58) Field of Classification Search ............. 297/284.4, 297/284.8, 284.9
See application file for complete search history.

(56) References Cited

U.S. PATENT DOCUMENTS

| | | | |
|---|---|---|---|
| 3,195,955 A | 7/1965 | Richardson et al. | |
| 3,258,259 A | 6/1966 | Bohlin | |
| 3,273,877 A | 9/1966 | Geller et al. | |
| 4,155,592 A | 5/1979 | Tsuda et al. | |
| 4,309,058 A | 1/1982 | Barley | |
| 4,462,635 A | 7/1984 | Lance | |
| 5,224,757 A | 7/1993 | Geitz et al. | |
| 5,482,353 A | 1/1996 | Lance | |
| 5,505,520 A | 4/1996 | Frusti et al. | |
| 5,507,559 A | 4/1996 | Lance | |
| 5,518,294 A | 5/1996 | Ligon, Sr. et al. | |
| 5,553,919 A | 9/1996 | Dennis | |
| 5,641,205 A * | 6/1997 | Schmidt ............... 297/284.4 X | |
| 5,685,606 A | 11/1997 | Lance | |
| 5,716,098 A | 2/1998 | Lance | |
| 5,769,490 A | 6/1998 | Falzon | |
| 5,788,328 A | 8/1998 | Lance | |
| 5,797,652 A | 8/1998 | Darbyshire | |
| 5,860,700 A | 1/1999 | Lance | |
| 5,954,399 A | 9/1999 | Hong | |
| 6,003,941 A | 12/1999 | Schuster, Sr. et al. | |
| 6,056,360 A * | 5/2000 | Schneider ................. 297/284.4 | |
| 6,152,531 A | 11/2000 | Deceuninck | |
| 6,254,186 B1 | 7/2001 | Falzon | |
| 6,338,530 B1 * | 1/2002 | Gowing .................... 297/284.4 | |
| 6,394,546 B1 | 5/2002 | Knoblock et al. | |

(Continued)

FOREIGN PATENT DOCUMENTS

EP 0 420 824 A1 4/1991

(Continued)

*Primary Examiner*—Rodney B. White
(74) *Attorney, Agent, or Firm*—Kang Intellectual Property Law LLC; Grant D. Kang

(57) ABSTRACT

An ergonomic device for a seat is disclosed. The ergonomic device includes a first side plate and a second side plate spaced apart from the first side plate. A hinge connects the second side plate to the first side plate. The ergonomic device also includes at least one pulley connected to the first side plate or the second side plate. A traction element is connected to at least one of the side plates, and the traction element has a cable wire generally wrapped about the at least one pulley. The traction element engages the pulley to at least partially collapse the hinge when a tractive force is applied to the traction element.

32 Claims, 15 Drawing Sheets

U.S. PATENT DOCUMENTS

| | | | |
|---|---|---|---|
| 6,402,246 | B1 | 6/2002 | Mundell |
| 6,412,868 | B1 | 7/2002 | Kuster et al. |
| 6,471,294 | B1 | 10/2002 | Dammermann et al. |
| 6,595,585 | B2 | 7/2003 | Mundell |
| 6,644,740 | B2 | 11/2003 | Holst et al. |
| 6,676,214 | B2 * | 1/2004 | McMillen et al. ..... 297/284.4 X |
| 6,688,443 | B2 * | 2/2004 | Liu ..................... 297/284.4 X |
| 6,692,074 | B1 * | 2/2004 | Kopetzky et al. ........ 297/284.8 |
| 6,893,089 | B2 * | 5/2005 | McMillen et al. ........ 297/284.4 |
| 6,905,170 | B2 * | 6/2005 | McMillen et al. ........ 297/284.4 |
| 6,908,153 | B2 * | 6/2005 | Blendea ................... 297/284.4 |
| 6,918,634 | B2 | 7/2005 | Elliot |
| 6,945,600 | B2 * | 9/2005 | Liu .......................... 297/284.4 |
| 7,137,664 | B2 * | 11/2006 | McMillen et al. ........ 297/284.4 |
| 7,140,680 | B2 * | 11/2006 | McMillen et al. ........ 297/284.9 |
| 7,140,681 | B2 * | 11/2006 | McMillen ................ 297/284.9 |
| 7,328,950 | B2 * | 2/2008 | McMillen et al. ........ 297/284.4 |
| 2003/0062749 | A1 * | 4/2003 | Liu et al. ................. 297/284.4 |
| 2004/0108760 | A1 * | 6/2004 | McMillen ................ 297/284.4 |
| 2004/0212227 | A1 | 10/2004 | Farquhar et al. |
| 2005/0017555 | A1 | 1/2005 | Elliot |
| 2005/0023873 | A1 | 2/2005 | Massara et al. |
| 2006/0163924 | A1 * | 7/2006 | Liu ......................... 297/284.4 |
| 2006/0261653 | A1 * | 11/2006 | McMillen et al. ......... 297/284.4 |
| 2007/0228789 | A1 * | 10/2007 | McMillen ................ 297/284.4 |

FOREIGN PATENT DOCUMENTS

| | | |
|---|---|---|
| EP | 0328137 B1 | 4/1992 |
| EP | 0 508 964 A2 | 10/1992 |
| EP | 0 518 830 A1 | 12/1992 |
| EP | 0 540 481 A1 | 5/1993 |
| EP | 0 582 821 A1 | 2/1994 |
| EP | 0 296 938 A1 | 12/1998 |
| FR | 2 596 334 A1 | 10/1987 |
| FR | 2 765 531 A1 | 1/1999 |
| GB | 526572 | 9/1940 |

* cited by examiner

COMFORT BELT SPRING PULLEY

CROSS-REFERENCE TO RELATED APPLICATIONS

None.

BACKGROUND OF THE INVENTION

1. Field of the Invention

The present invention relates to ergonomic devices for vehicle seats and more particularly to belt-type ergonomic devices.

2. Related Art

Vehicle seats typically include one or more ergonomic device, such as a lumbar support. Belt-type ergonomic devices are a common type of vehicle seat ergonomic device. The belt-type ergonomic device generally includes an adjustable belt or strap. The belt supports the vehicle seat occupant and is adjusted to vary the effective length or stiffness of the support.

Previously, belt-type ergonomic devices adjusted only on one side or included complex devices for bi-lateral adjustment. When the belt or strap is adjusted only on one side, the belt does not provide uniform support to the seat occupant. Non-uniform support often leads to distress or discomfort of the seat occupant after a period of time.

Furthermore, in the particular art of supporting the lumbar spine, there is a need for spinal relief. That is, the bony vertebrae of the spine become uncomfortable if direct pressure is applied to them by a lumbar support pressure surface. It is preferable to apply lumbar supporting pressure bilaterally adjacent to the spinal column, while maintaining a vertical recess or channel to accommodate the vertebrae.

In addition to providing uniform, bi-lateral support, a belt-type ergonomic device must also be crashworthy. Vehicle seats must meet government and industry standards of crashworthiness, and although an ergonomic device must be simple to use, cost effective, and easy to assemble, the ergonomic device must not decrease the overall crashworthiness of the vehicle seat. In all instances, the ergonomic device must be designed to maintain or improve the overall crashworthiness of the vehicle seat.

Finally, the belt-type ergonomic device must be designed with its manufacture in mind. Economy, efficiency and speed of assembly are always a concern in manufacturing industries, particularly the automobile industry. There is a constant need for reducing costs of component assembly and packaging for shipments of those components between manufacturers and assemblers of them.

Therefore, there is a continuing need in the art for a simple, cost-effective device for bi-lateral adjustment of a belt-type ergonomic device. There is a need in the art for a belt-type ergonomic device that provides spinal relief and is also crashworthy. Finally, there is a need for reduced costs and increased efficiency in the assembly of ergonomic devices.

SUMMARY OF THE INVENTION

In view of the above problems, the invention is an ergonomic device having a first side plate, a second side plate, a hinge connecting the first side plate to the second side plate, a pulley mounted to one of the side plates, and a traction element having a cable wire wrapped about the pulley. The pulley allows the traction element to adjust the side plates uniformly and also reduces the force required to engage the traction element. When the traction element is engaged, the side plates concurrently move toward or away from one another such that the ergonomic device provides uniform support. In other words, the ergonomic device tightens on both sides through the use of the pulley to provide bi-lateral adjustment.

In one aspect of the invention, the ergonomic device is a belt-type ergonomic device with a pulley connected to each side plate. The use of an additional pulley further reduces the force required to engage the traction element.

In another aspect of the invention, the ergonomic device includes a spinal relief zone located at the hinge. The spinal relief zone provides a gap or indentation in the ergonomic device to avoid uncomfortable point pressure on the vertebral process of the spine. The spinal relief zone is automatically formed by the hinge. Therefore, the ergonomic device does not require additional components or manufacturing operations to achieve this additional aspect.

In yet another aspect of the invention, the ergonomic device includes a two-part belt that is assembled at the hinge. The hinge includes several hinge members each having an integral portion and a mounting portion. The integral portion is integrally formed as part of the side plate, and the mounting portion is adapted for mounting to the other side plate. The mounting portion may be mounted to one of the side plates through the use of a locking fastener. The use of the hinge member having the mounting portion allows the belt to be manufactured in two components, thereby reducing the complexity and costs of manufacture.

Thus, in furtherance of the above goals and advantages, the present invention is, briefly, an ergonomic device for a seat. The ergonomic device includes a first side plate and a second side plate spaced apart from the first side plate. A hinge connects the second side plate to the first side plate. The ergonomic device also includes at least one pulley connected to the first side plate or the second side plate. A traction element is connected to at least one of the side plates, and the traction element has a cable wire generally wrapped about the at least one pulley. The traction element engages the pulley to at least partially collapse the hinge when a tractive force is applied to the traction element.

Further, the invention is, briefly, a lumbar support for a seat with a seat back frame. The lumbar support includes a belt and a traction element connected to the belt. The belt includes a first side plate, a second side plate spaced apart from the first side plate, and a hinge extending therebetween. At least one pulley is connected to the first side plate or the second side plate. The belt also includes a first end portion outwardly extending from the first side plate, and a second end portion outwardly extending from the second side plate. The first end portion and the second end portion each have an attachment tab at its respective terminal end, and the attachment tab is adapted to connect to the seat back frame. The traction element includes a cable wire generally wrapped about the pulley and is connected to at least one of, if not both, the side plates. The traction element is adapted to at least partially collapse the hinge when a tractive force is applied to the traction element.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
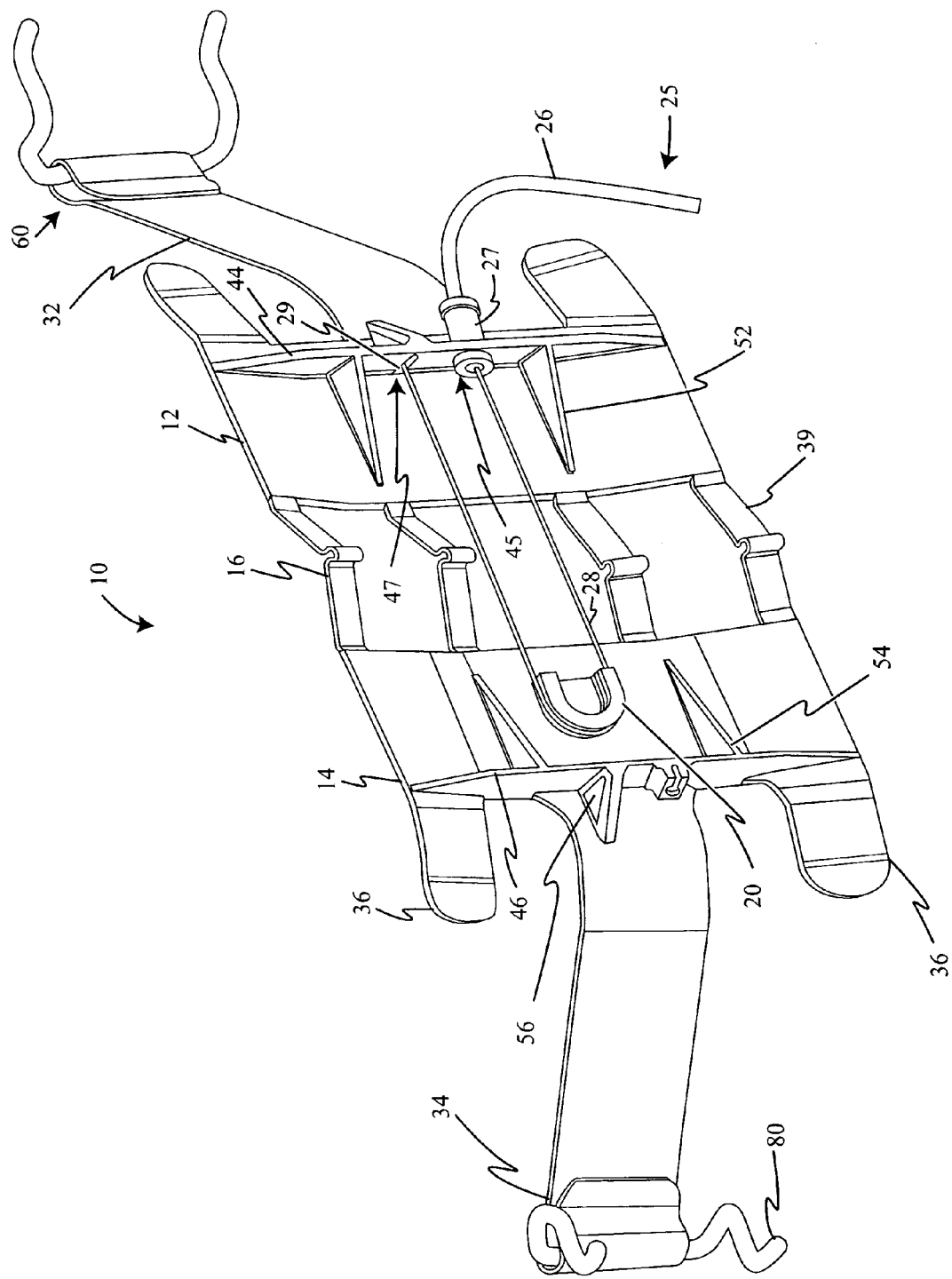
FIG. 1 is a rear perspective view of a belt in a first embodiment.

FIG. 1 illustrates a belt 10. A belt can be a flexible component of an ergonomic device for a seat. Generally, belts have a rectangular, strap-like shape. The belt 10 may be made of metal or plastic. The belt 10 has a first side plate 12, a second side plate 14, and a hinge 16. The hinge 16 connects the first side plate 12 to the second side plate 14. The hinge 16 limits the transverse movement of the side plates as the first side plate 12 and the second side plate 14 move toward or away from one another. The hinge 16 includes at least one hinge member, also termed a hinge portion, 39. While four hinge members 39 are illustrated in FIG. 1, those skilled in the art would understand that a greater or lesser number of hinge members could be used.

A first pulley 20 is connected to the second side plate 14. In the embodiment depicted in FIG. 1, the belt 10 is made of plastic, and the first pulley 20 is integrally formed or molded with the second side plate 14. The belt 10 also includes a first end portion 32 and a second end portion 34. The first end portion 32 extends outwardly at an angle from the first side plate 12, and the second end portion 34 extends outwardly at an angle from the second side plate 14. Each end portion 32, 34 terminates in an attachment tab 60. The attachment tabs 60 are used to mount the belt 10, and support wires 80 may be used in conjunction with this purpose. Ears, also termed projections, 36 also extend from the side plates 12, 14.

The first side plate 12 includes a first rib 44, and the second side plate 14 includes a second rib 46. In the embodiment depicted in FIG. 1, the belt 10 is made from plastic, and the ribs 44, 46 are integrally formed or molded as part of the side plates 12, 14.

Some embodiments include a gusset that connects the rib to the side plate for additional support. In the embodiment depicted in FIG. 1, the belt 10 includes a first gusset 52, a second gusset 54, and a third gusset 56. While three gussets are illustrated, those skilled in the art would understand that a greater or lesser number of gussets may be used.

A traction element 25 is connected to the belt 10. The traction element 25, which may be a Bowden cable, has a sleeve 26 and a cable wire 28. The cable wire 28 is at least partially wrapped around the first pulley 20. The traction element 25 is attached to the belt 10 in such a way as to at least partially collapse the hinge 16 when a tractive force is applied to the traction element 25. As those skilled in the art would understand, the use of a pulley reduces the amount of tractive force required to at least partially collapse the hinge 16. In the embodiment depicted in FIG. 1, the traction element 25 has a cable fastener 27, such as a plastic fitting, that connects the sleeve 26 to the first rib 44 and a cable end 29 which is also connected to the first rib 44. In the depicted embodiment, the first rib 44 includes a first cutout 45 to receive the cable fastener 27 and a second cutout 47 to receive the cable end 29.

Figure 2:
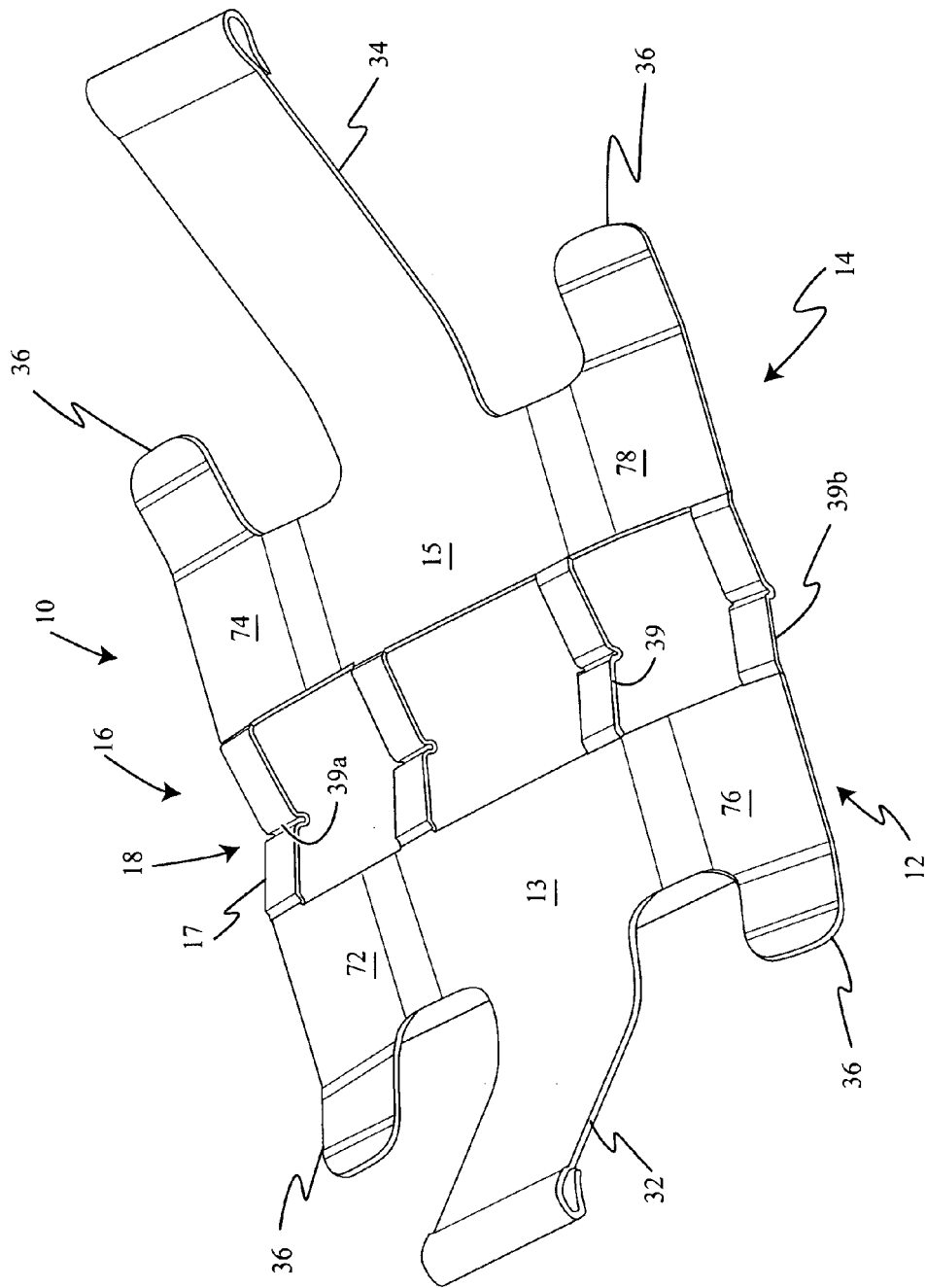
FIG. 2 is a front perspective view of the belt of FIG. 1.

FIG. 2 illustrates a front perspective view of the belt 10. As noted above, the belt 10 includes the first side plate 12, the second side plate 14, and the hinge 16. The hinge 16 is located centrally between the first side plate 12 and the second side plate 14. Each hinge member 39 has a center U-shaped portion 18 and two end members 17. The end members 17 extend from the center U-shaped portion such that each hinge member 39 has an overall V-shape. The hinge 16 is capable of movement such that the first side plate 12 and the second side plate 14 move towards or away from one another.

The first side plate 12 has a first center portion 13, a first top portion 72, and a first bottom portion 76. Similarly, the second side plate 14 has a second center portion 15, a second top portion 74, and a second bottom portion 78. The top portions 72, 74 are also termed upper portions, and the bottom portions 76, 78 are also termed lower portions. In the embodiment depicted in FIG. 2, side plates 12, 14 are arcuate such that the top portions 72, 74 and the bottom portions 76, 78 are angled slightly away from the respective center portion 13, 15. Further, in the depicted embodiment, the center portions 13, 15 are co-planar. The ears 36 extend outwardly form the top and bottom portions 72, 74, 76, 78. In the depicted embodiment, the ears 36 also extend at an angle to the respective side plate portion 72, 74, 76, 78. As noted above, the end portions 32, 34 extend outwardly from the side plates 12, 14. In the embodiment depicted in FIG. 2, the end portions extend from the center portions 13, 15.

In the embodiment depicted in FIG. 2, the hinge 16 includes an upper hinge portion 39a and a lower hinge portion 39b. The upper hinge portion 39a connects the first top portion 72 of the first side plate 12 with the second top portion 74 of the second side plate 14. The lower hinge portion 39b connects the first bottom portion 76 of the first side plate 12 with the second bottom portion 78 of the second side plate 14.

Figure 3:
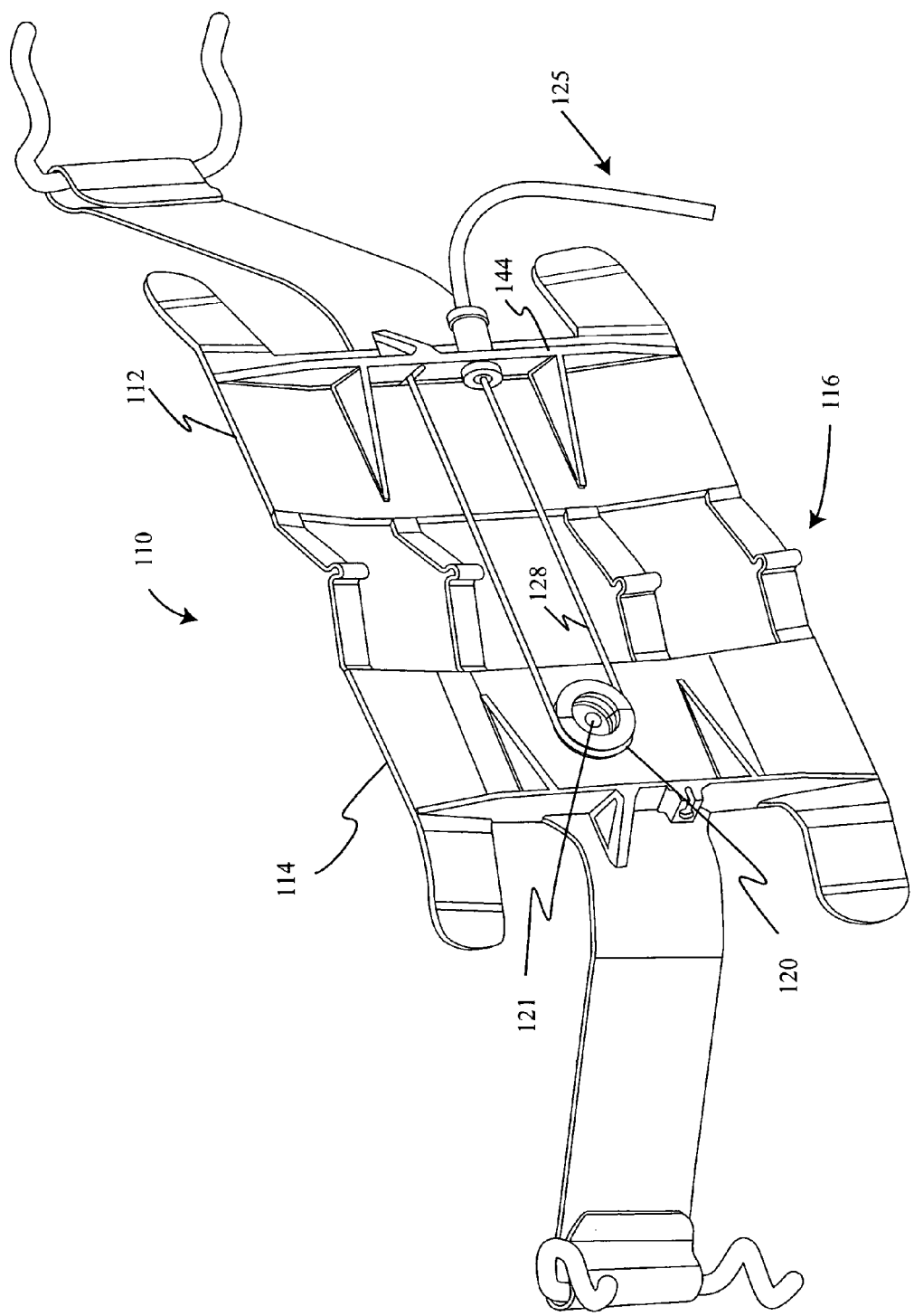
FIG. 3 is a rear perspective view of a belt in a second embodiment.

FIG. 3 illustrates a second embodiment of the belt, generally indicated by numeral reference 110. The belt 110 includes a first side plate 112, a second side plate 114, a hinge 116, a first pulley 120, and a traction element 125. In the embodiment depicted in FIG. 3, the first pulley 120 is rotatably mounted to the second side plate 114. As an example, the first pulley 120 may be mounted through the use of a pin or rivet 121 such that the first pulley 120 rotates about the pin 121. The first pulley 120 may be in the form of a metal or plastic wheel. The traction element 125 includes a cable wire 128 that is at least partially wrapped about the first pulley 120. The traction element 125 is connected to the first side plate 112. In the embodiment depicted in FIG. 3, the traction element 125 is connected to a first rib 144 of the first side plate 112. When a tractive force is applied to the traction element 125, the traction element 125 acts upon the first pulley 120 and the first rib 144 to at least partially collapse the hinge 116. Because the depicted embodiment utilizes a pulley, the amount of tractive force required to at least partially collapse the hinge 116 is less than the amount of tractive force required if the traction element was directly connected to the first and second side plates 112, 114.

Figure 4:
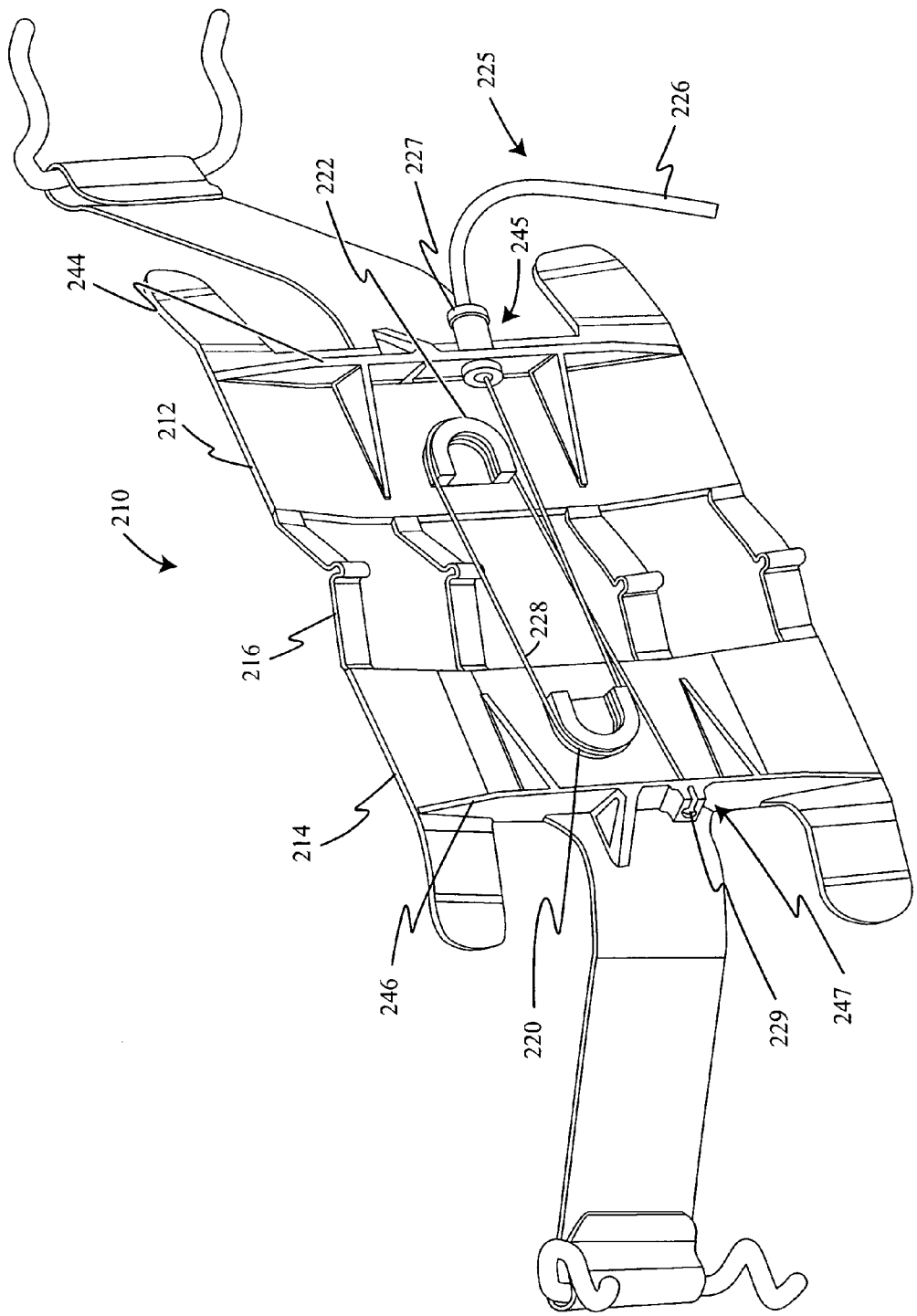
FIG. 4 is a rear perspective view of a belt in a third embodiment.

FIG. 4 illustrates a third embodiment of the belt, generally indicated by numeral reference 210. The belt 210 includes a first side plate 212, a second side plate 214, a hinge 216, a first pulley 220, a second pulley 222, a traction element 225, a first rib 244, and a second rib 246. The first pulley 220 is attached to the second side plate 214, and the second pulley 222 is attached to the first side plate 212. In the embodiment depicted in FIG. 4, the first pulley 220 is integrally formed or molded as part of the second side plate 214, and the second pulley 222 is integrally formed or molded as part of the first side plate 212. However, the pulleys 220, 222 could equally be rotatably mounted to the side plates 212, 214. The traction element 225 includes a sleeve 226, a cable fastener 227, a cable wire 228, and a cable end 229. The cable end 229 is connected to the second side plate 214, and the cable fastener 227 connects the sleeve 226 to the first side plate 212. In the embodiment depicted in FIG. 4, the first rib 244 includes a first cutout 245 to receive the cable fastener 227, and the second rib 246 includes a second cutout 247 to receive the cable end 229. The cable wire 228 is generally wrapped about each pulley 220, 222. When a tractive force is applied to the traction element 225, the cable wire 228 acts upon the pulleys 220, 221 to at least partially collapse the hinge 216 in order to move the side plates 212, 214 towards one another. The use of the pulley 220, 222 significantly reduces the amount of tractive force required to collapse the hinge 216 in comparison to the amount of tractive force required when the traction element 225 is directly connected to the side plates 212, 214 without the assistance of a pulley.

Figure 5:
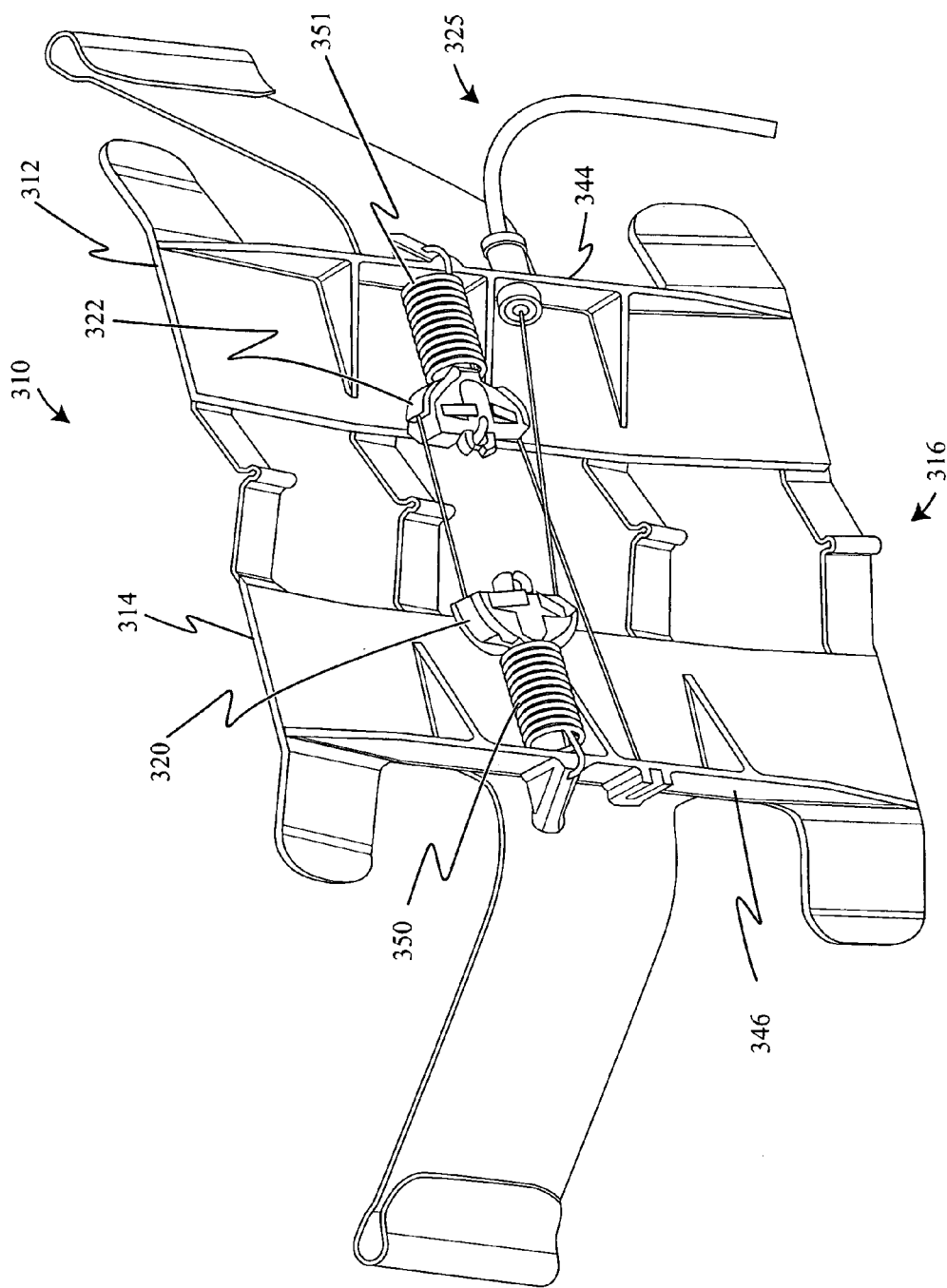
FIG. 5 is a rear perspective view of a belt in a fourth embodiment.

FIG. 5 illustrates a fourth embodiment of the belt. The belt 310 includes a first side plate 312, a second side plate 314, a hinge 316, a first pulley 320, a second pulley 322, a traction element 325, a first rib 344, and a second rib 346. The first pulley 320 is connected to the second side plate 314 through the use of a first pulley spring 350, and the second pulley 322 is connected to the first side plate 312 through the use of a second pulley spring 351. The springs 350, 351 greatly improve the crashworthiness of the belt 310. In the embodiment depicted in FIG. 5, the springs 350, 351 connect the pulleys 320, 322 to the respective side plate 312, 314 at the ribs 344, 346. In other words, the first pulley 320 is connected to the second rib 346 via the first pulley spring 350, and the second pulley 322 is connected to the first rib 344 via the second pulley spring 351.

Figure 6:
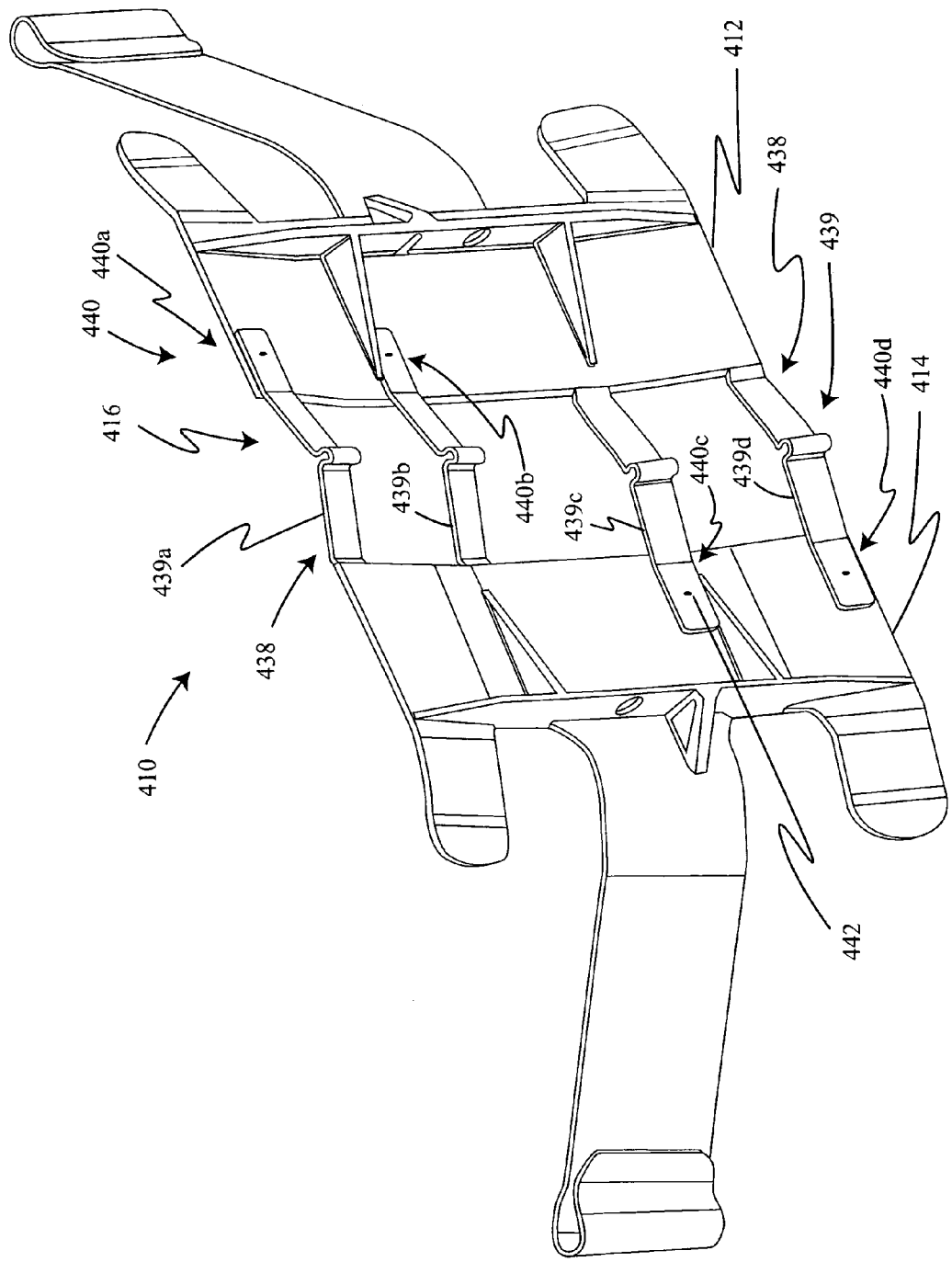
FIG. 6 is a rear perspective view of a belt in a fifth embodiment.

FIG. 6 illustrates a fifth embodiment of the belt. In the embodiment depicted in FIG. 6, pulleys, traction elements, and other components have been omitted for clarity. The belt 410 includes a first side plate 412, a second side plate 414, and a hinge 416. In the embodiment depicted in FIG. 6, the hinge 416 includes several hinge members 439 each having an integral portion 438 and a mounting portion 440. The integral portion 438 is integrally formed as part of the respective side plate 412, 414. The mounting portion 440 is adapted for mounting to one of the side plates 412, 414. The mounting portion 440 may be mounted to one of the side plates through the use of a locking fastener 442, such as a rivet, zip-tie, heat stake, or plastic snap. In the embodiment depicted in FIG. 6, each side plate 412, 414 has two hinge members 439, each having the mounting portion 440. However, those skilled in the art would understand that each side plate 412, 414 may have a greater or lesser number of hinge members 439. The use of the hinge 416 with the mounting portion 440 allows the belt 410 to be manufactured in two components, thereby reducing the complexity and costs of manufacture.

As an example, the second side plate 414 includes a first hinge member 439a and a second hinge member 439b, and the first side plate 412 includes a third hinge member 439c and a fourth hinge member 439d. Initially, the side plates 412, 414 are not assembled to one another. In a first step, the first side plate 412 is placed next to the second side plate 414. A first mounting portion 440a of the first hinge member 439a is placed on top of the first side plate 412. Thereafter, the locking fastener 442 is used to mount the mounting portion 440a of the first hinge member 439a to the first side plate 412. A second mounting portion 440b of the second hinge member 439b is then placed on top of the first side plate 412. Thereafter, the locking fastener 442 is used to mount the mounting portion 440b of the second hinge member 439b to the first side plate 412. After the first and second hinge members 439a, 439b are mounted, a third and a fourth mounting members 440c, 440d are placed upon the second side plate 414. Locking fasteners 442 are then used to mount the mounting members 440c, 440d. In this manner, the single belt 410 can be assembled from two components. Moreover, where the first and second side plates 412, 414 are mirror images of one another and made from plastic, only a single plastic molding die is required, thereby reducing tooling costs.

Figure 7:
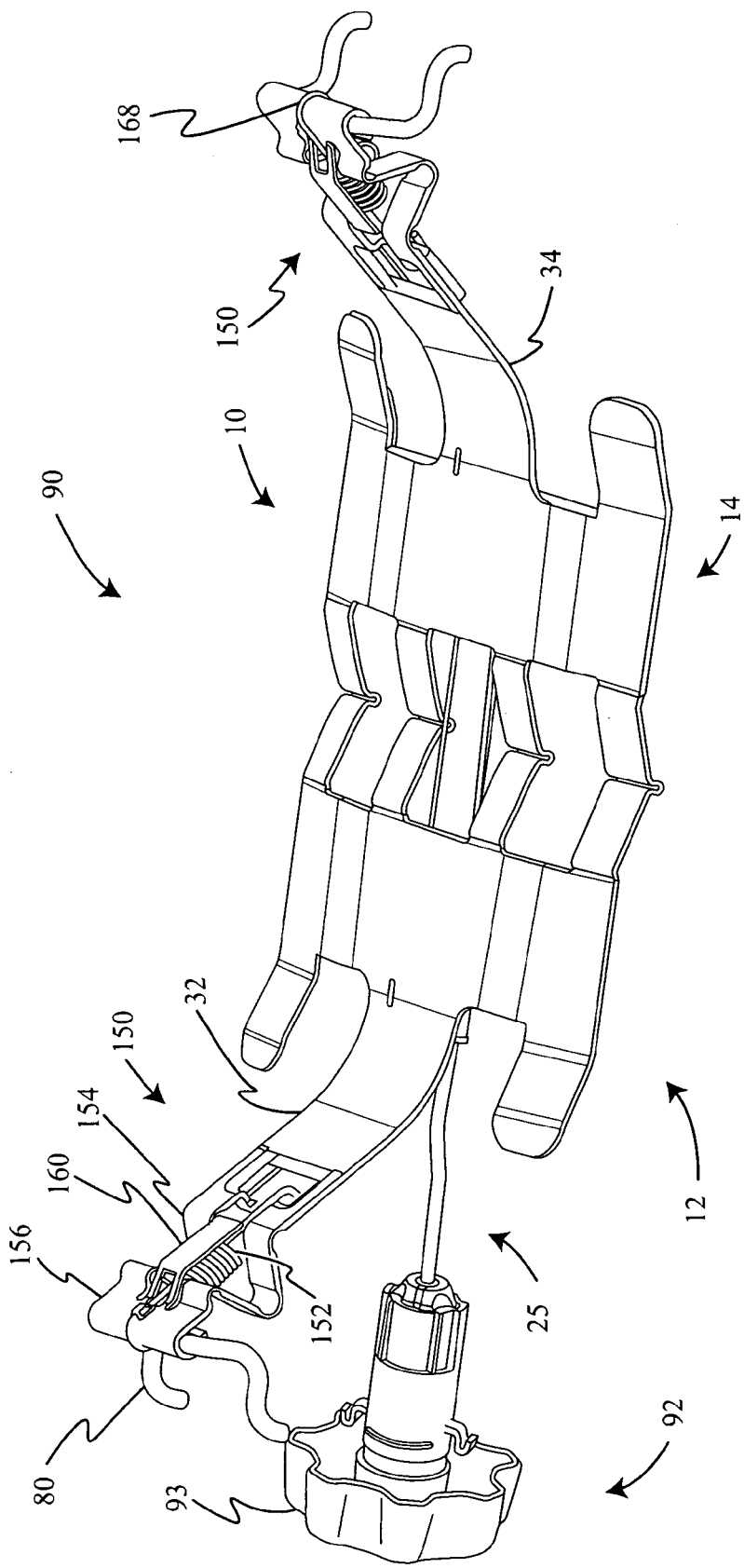
FIG. 7 is a front perspective view of an ergonomic device.

FIG. 7 illustrates an ergonomic device 90. The ergonomic device 90 may be used as a lumbar support, a side support, a thigh support, or some other type of support. The ergonomic device 90 includes the belt 10, the traction element 25, and an actuator 92. The belt includes the first side plate 12 and the second side plate 14. The actuator 92 is connected to the traction element 25 and is adapted to apply a tractive force to the traction element 25. Although the actuator 92 is illustrated as being near the first side plate 12, those skilled in the art would understand that the actuator 92 may be placed in other locations. In the embodiment depicted in FIG. 7, the actuator 92 includes a lever 93, such as a knob. While the actuator 92 is illustrated as a manual actuator, those skilled in the art would understand that the actuator could equally be a powered actuator.

In some embodiments, the ergonomic device 90 also includes a belt extension 150 at the terminal end of each end portion 32, 34. In the embodiment depicted in FIG. 7, the belt extensions 150 are integral with the respective end portion 32, 34; however, they could equally be a separate component mounted on the respective end portion 32, 34. The belt extensions 150 each include at least one tensioning member 152, such as a wire spring, a flexible tab 154, an attachment tab 156, and rectangular opening 158 (best seen in FIG. 8), which acts as a receiver. The belt extension 150 includes a belt extension tongue 160 that fits within the receiver 158 and extends over the spring 152. The belt extension tongue 160 can slide relative to the receiver 158. The flexible tab 154 allows the ergonomic device 90 to be actuated without twisting. For example, if the ergonomic device 90 is used as a lumbar support, the flexible tab 154 allows the belt 10 to move toward or away from a seat occupant but significantly reduces the ability of the belt 10 to twist or rotate. The depicted flexible tab 154 is integrally formed to be thinner at its top and bottom angles. The flexible tab 154 allows the end portion 32, 34 of the belt 10 to have some transverse movement. In the depicted embodiment, the flexible tab 154 is V-shaped or wing shaped. Support wire 80 is connected to the attachment tab 156.

Figure 8:
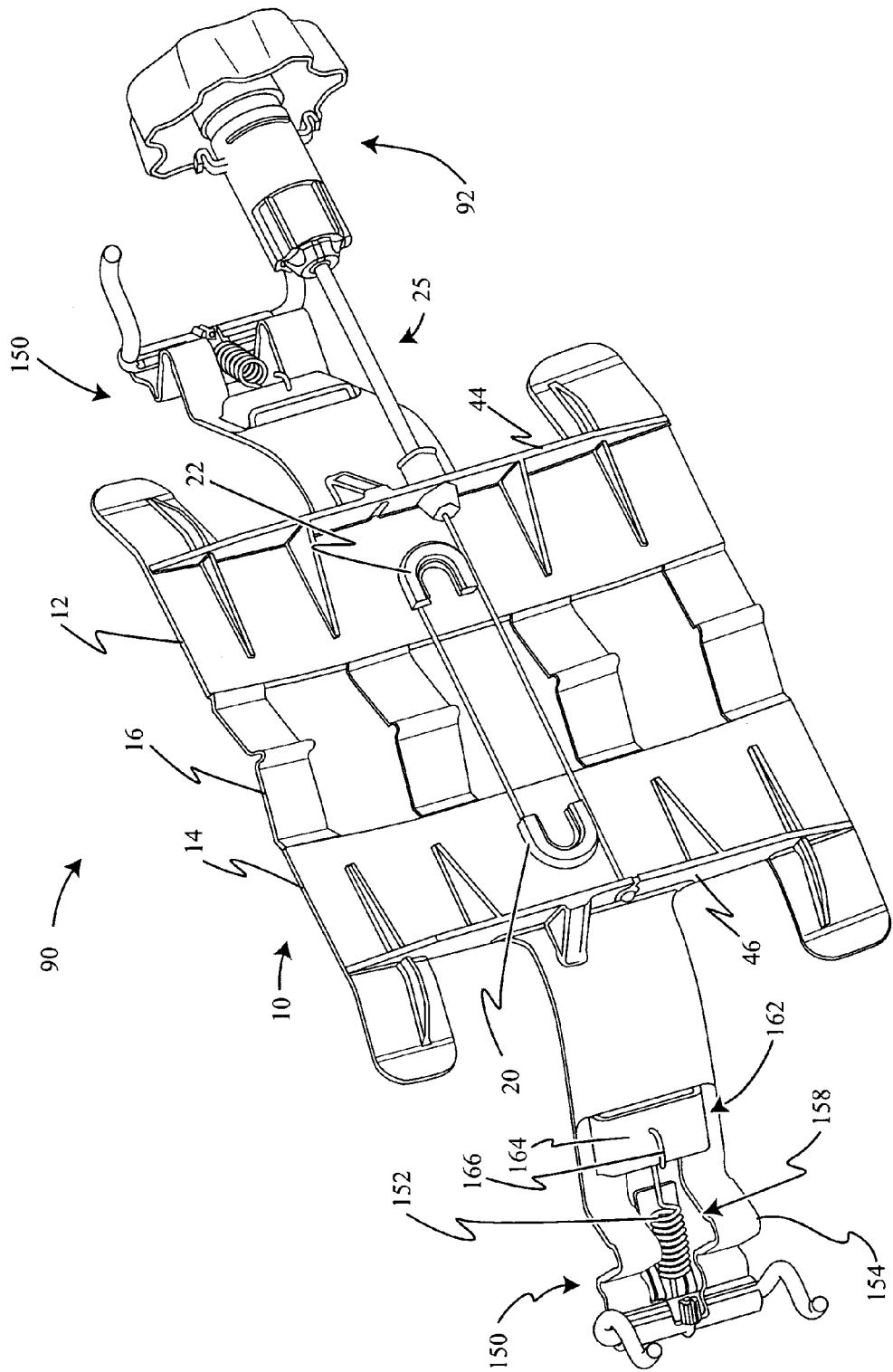
FIG. 8 is a rear perspective view of the ergonomic device of FIG. 7.

FIG. 8 is a rear perspective view of the ergonomic device 90. The ergonomic device 90 includes the belt 10, the traction element 25, and the actuator 92. The belt 10 includes the first side plate 12, the second side plate 14, the hinge 16, the first pulley 20, the second pulley 22, the first rib 44, and the second rib 46. Although the embodiment depicted in FIG. 8 has two pulleys, those skilled in the art would understand that a greater or lesser number of pulleys may be used.

FIG. 8 also illustrates a rear view of the belt extensions 150. The belt extensions 150 each include the flexible tab 154 and the receiver portion 158. As can be seen in FIG. 8, the spring 152 operates or moves behind the belt extension tongue 160. The belt extension 150 also includes a cup 162. In the depicted embodiment, the cup 162 is a rectangular disc-shaped portion. The cup 162 includes a slot 164 to receive a first end 166 of the wire spring 152. A second end 168 (best seen in FIG. 7) of the spring 152 hooks over the attachment tab 156.

Figure 9:
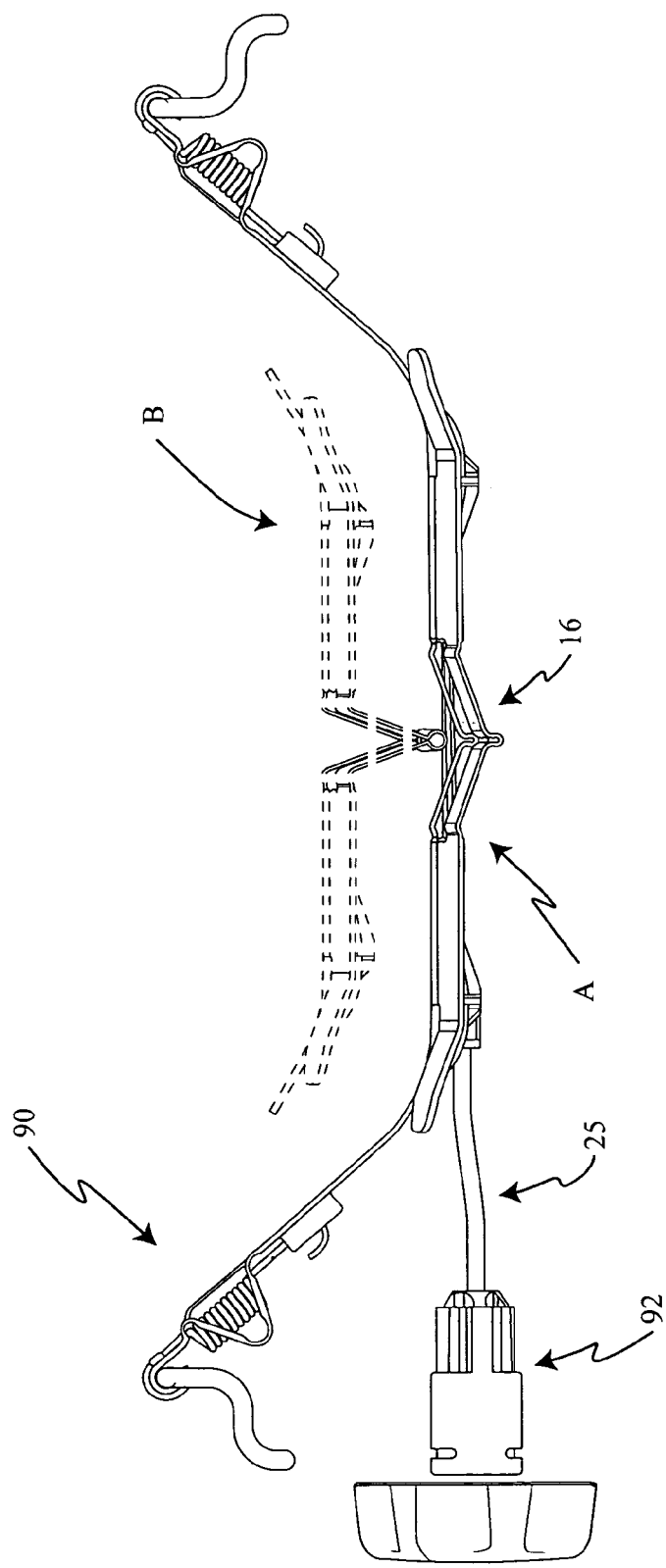
FIG. 9 is a bottom view of the ergonomic device of FIG. 7.

FIG. 9 illustrates a bottom view of the ergonomic device 90. FIG. 9 illustrates two positions of the ergonomic device 90. In a first position A, shown in solid, the hinge 16 is fully extended such that the side plates 12, 14 are in a stowed position. In a second position B, shown in phantom, the hinge 16 is fully collapsed such that side plates 12, 14 are in a fully deployed position. The actuator 92 is used to apply a tractive force on the traction element 25 to adjust the hinge 16 from the fully extended position to the fully collapsed position, or any position in-between.

Figure 10:
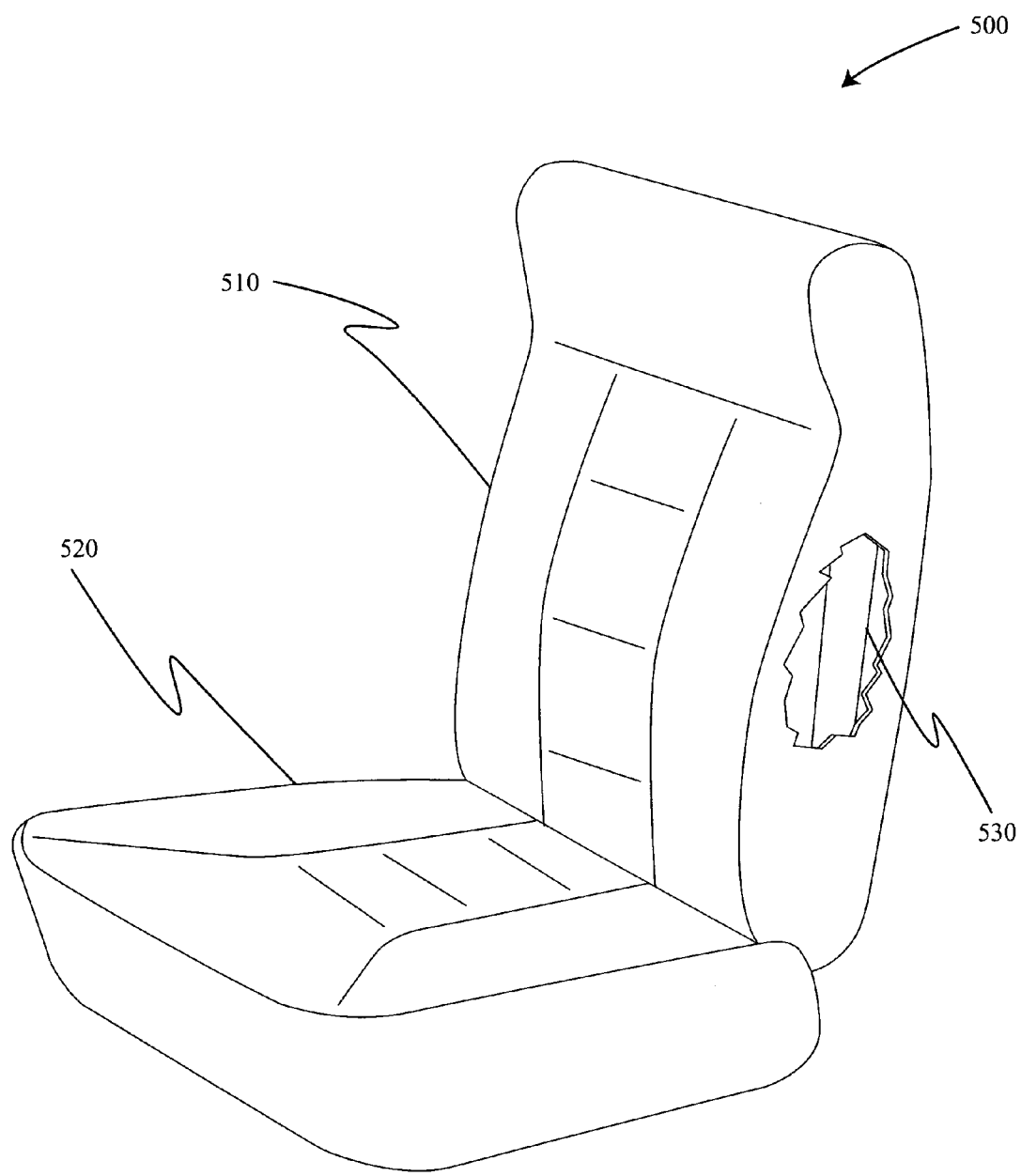
FIG. 10 is a top perspective view of a seat.

FIG. 10 illustrates a seat 500, which is adapted for mounting in a vehicle (not shown). The seat 500 includes a seat back 510 and a seat bottom 520. The seat back 510 is pivotably mounted to the seat bottom 520. The seat back includes a seat frame 530.

Figure 11:
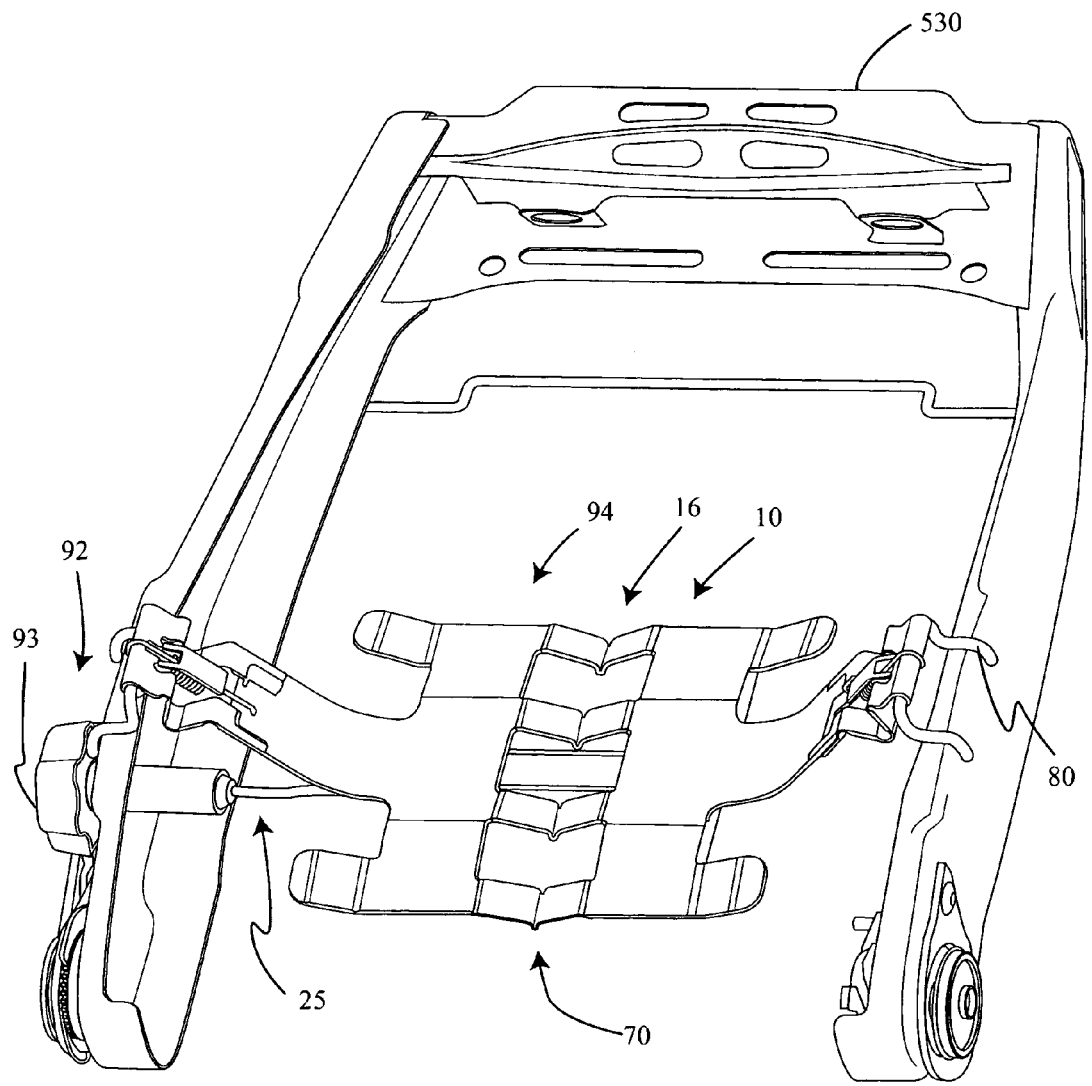
FIG. 11 is a front perspective view of a seat frame with a lumbar support.

FIG. 11 further illustrates the seat frame 530. In the embodiment depicted in FIG. 11, the seat frame includes a lumbar support 94. The lumbar support 94 includes the belt 10, the traction element 25, the actuator 92, and the lever 93. The actuator 92 is connected to the traction element 25 and is rotatably mounted to the seat frame 530. The lumbar support 94 is connected to the seat frame 530. In the embodiment depicted in FIG. 11, the belt 10 is connected to the seat frame 530 through the use of support wires 80; however, other mounting devices may be used.

The lumbar support 94 includes a spinal relief zone 70 located at the hinge 16. Those who are skilled in the ergonomic arts appreciate that the particular shape of the human anatomy must be accommodated by the lumbar support 94 to make the seat occupant comfortable. This necessity includes incorporating a gap or indentation in any lumbar support to avoid uncomfortable point pressure on the vertebral process of the spine. Prior art lumbar supports created such a spinal relief gap by machining or molding an indentation into the lumbar support pressure surface. As is evident from FIG. 11, the hinge 16 of the lumbar support 94 automatically creates such an advantageous spinal relief zone 70 for spinal relief.

Figure 12:
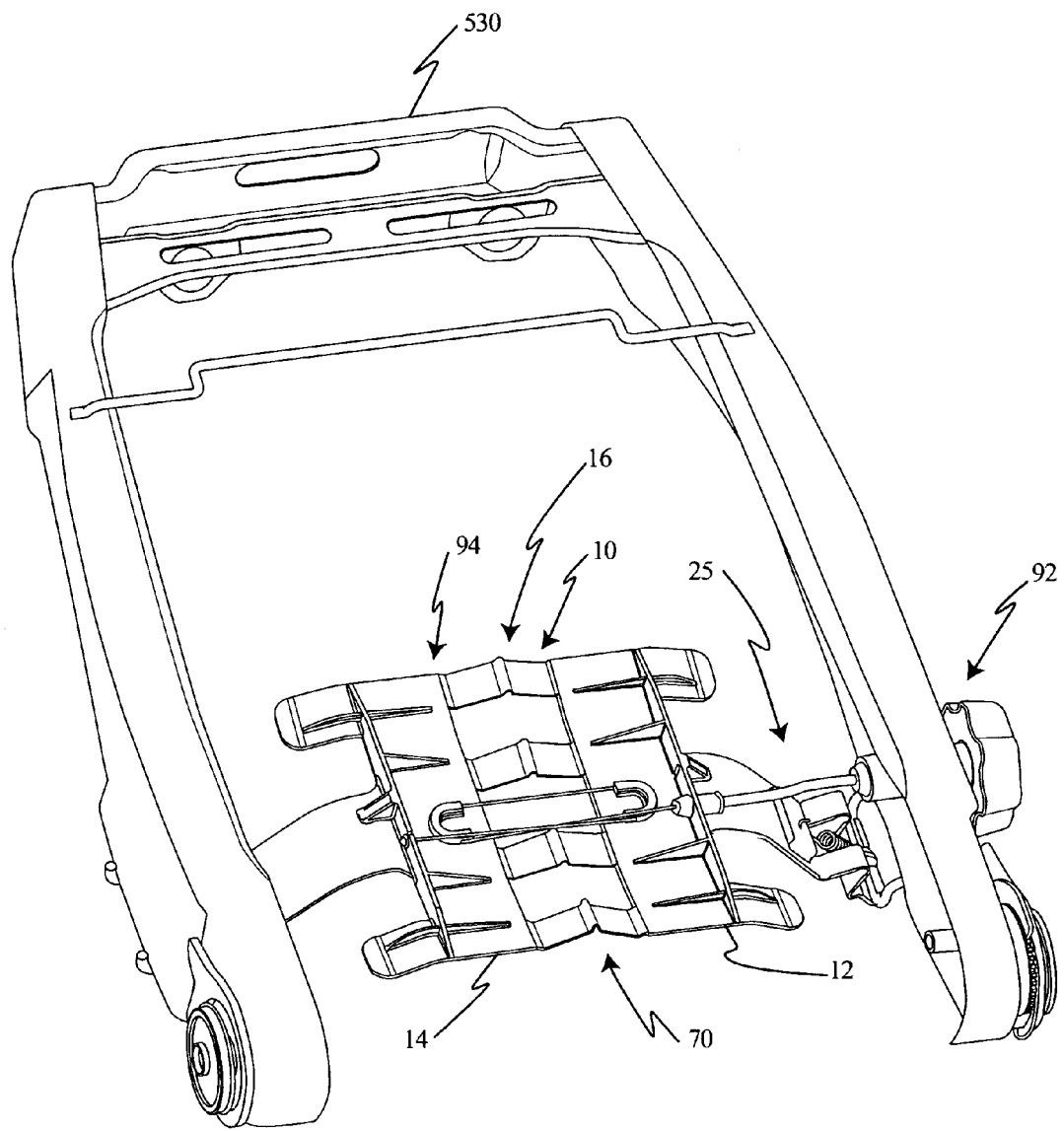
FIG. 12 is a rear perspective view of the seat frame of FIG. 11.

FIG. 12 illustrates a rear view of the lumbar support 90 mounted in the seat frame 530. Although the embodiment depicted in FIG. 12 has two pulleys, those skilled in the art would understand that a greater or lesser number of pulleys may be used. The traction element 25 is connected to the belt 10. The traction element 25 applies a uniform force on each side of the belt 10 when the belt 10 is adjusted. This allows the belt 10 to apply a uniform pressure to the seat occupant. Further, because the spinal relief zone 70 is located along the hinge 16 and because pressure is applied uniformly along the hinge 16, the spinal relief zone 70 is located substantially in the center of the belt 10 and will not significantly shift in position as the belt 10 is adjusted. This is significant as the spinal relief zone of prior devices would laterally shift as one side of the belt was adjusted.

Figure 13:
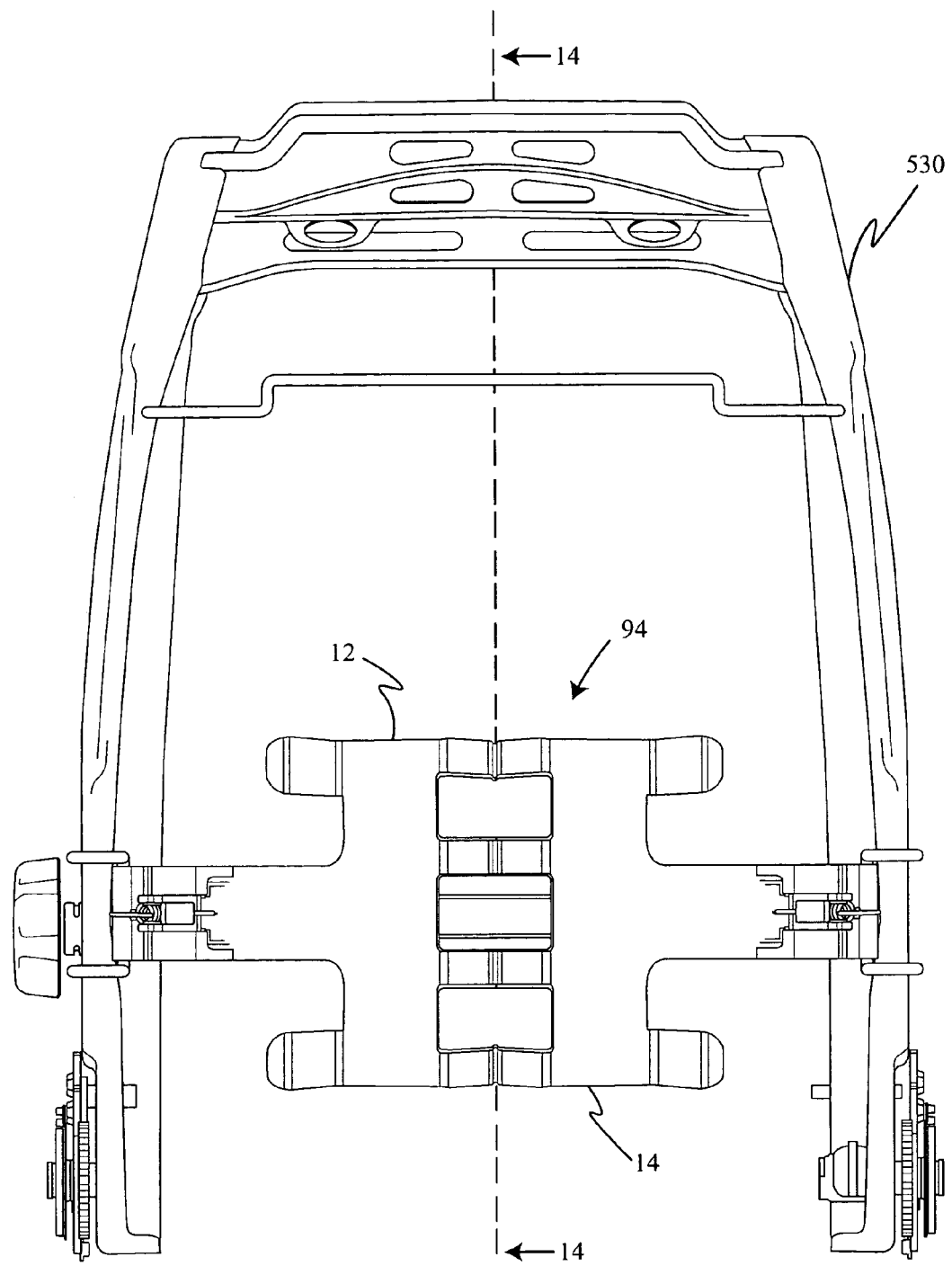
FIG. 13 is a front view of the seat frame of FIG. 11.
Figure 14:
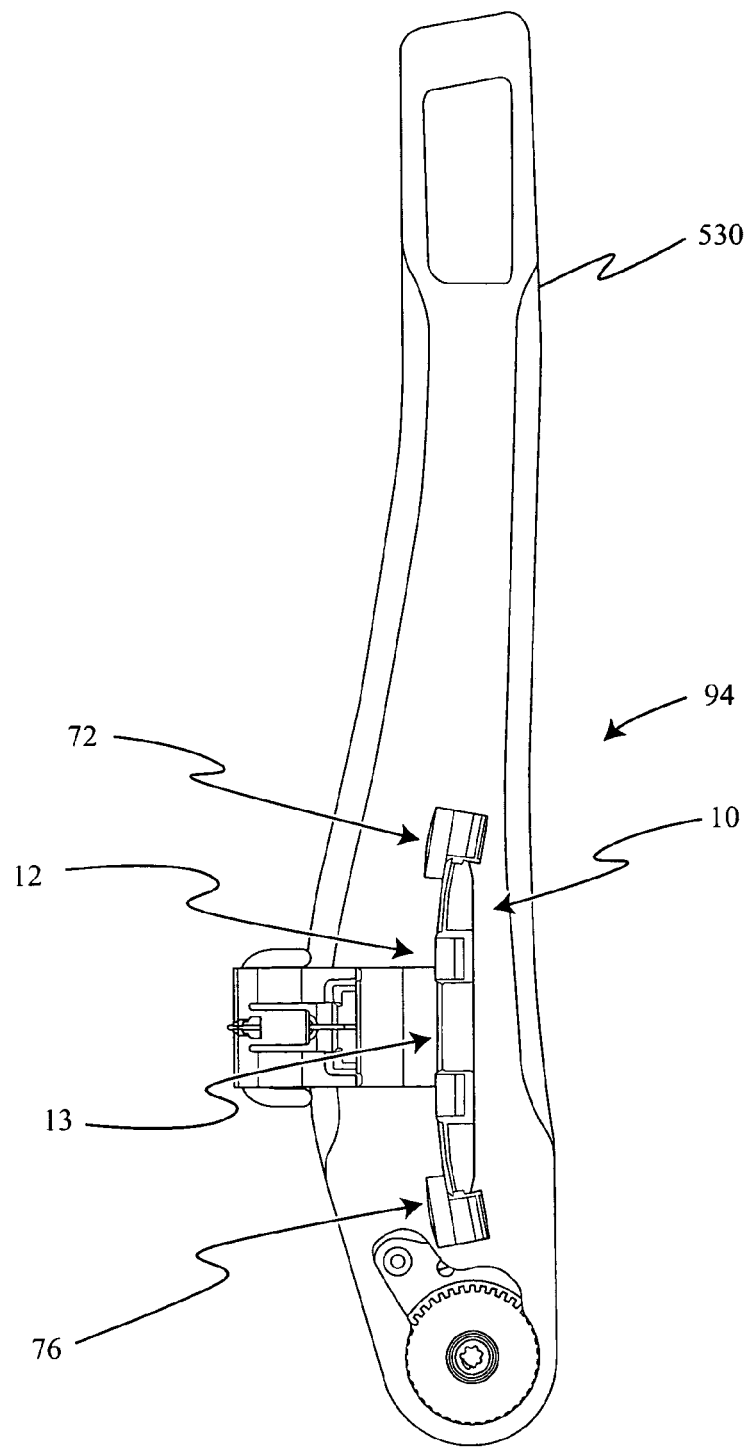
FIG. 14 is a side sectional view of the seat frame taken along lines 14-14 in FIG. 13.

FIG. 13 illustrates a front view of the seat frame 530, and FIG. 14 illustrates a sectional side view of the seat frame 530 taken along line 14-14 in FIG. 13. The lumbar support 94 includes the belt 10. As noted above, the belt 10 includes the first center portion 13, the first top portion 72, and the first bottom portion 76. As best seen in FIG. 14, the first top portion 72 and the first bottom portion 76 extend outwardly at an angle from the center portion 13. This allows the first side plate 12 to have an arcuate shape. The second side plate 14 (best seen in FIG. 13) has a similar shape.

Figure 15:
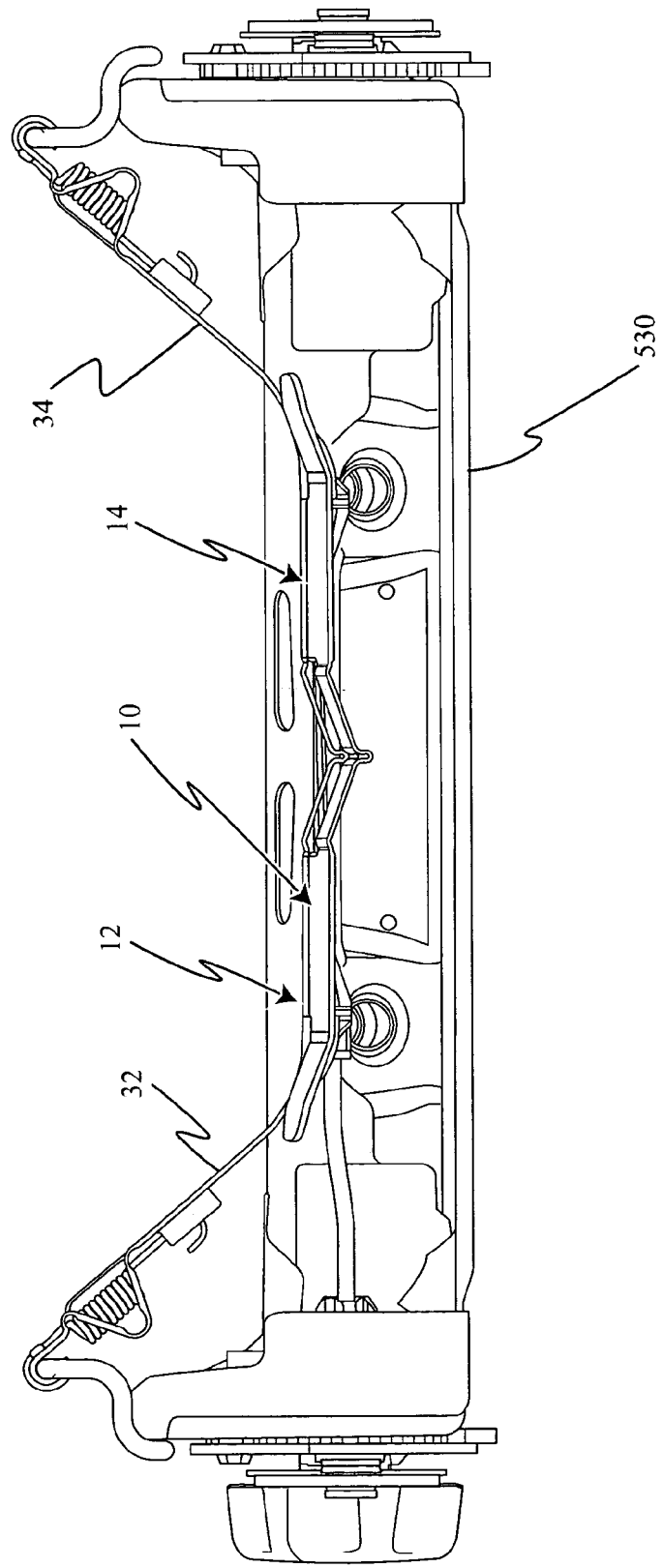
FIG. 15 is a bottom view of the seat frame of FIG. 11.

FIG. 15 illustrates a bottom view of the seat frame 530. As can be seen in FIG. 15, the first end portion 32 extends outwardly from the first side plate 12, and the second end portion 34 extends outwardly from the second side plate 14.

In operation, a seat occupant decides to adjust the lumbar support 94 of the seat back 510. The seat occupant grasps the lever 93 and rotates it to engage the actuator 92. The actuator 92 engages to apply a tractive force to the traction element 25. The application of the tractive force to the traction element 25 tensions the cable wire 28. The cable wire 28 tightens about the pulleys 20, 22 and applies the tractive force to the belt 10. Upon application of the tractive force, the first side plate 12 and the second side plate 14 move toward one another, thereby collapsing the hinge 16. The movement of the first side plate 12 and the second side plate 14 toward one another increases the tension in the end portions 32, 34. This also reduces the angle between the end portions 32, 34 and the respective side plate 12, 14 such that the depth of the lumbar support 94 is adjusted.

Also disclosed is a method of assembling an ergonomic device. The method includes the steps of: providing a first side plate with at least one hinge member, the at least one hinge member having an integral portion and a mounting portion; providing a second side plate spaced apart from the first side plate; connecting the mounting portion of the first side plate to the second side plate; connecting at least one pulley to the first side plate or the second side plate; wrapping a cable wire of a traction element generally about the at least one pulley; and connecting the traction element to at least one of the first side plate and the second side plate. Thereafter, an actuator may be connected to the traction element.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An ergonomic device for a seat comprising:
   a first side plate;
   a second side plate spaced apart from said first side plate;
   a hinge extending from said second side plate to said first side plate;
   a first pulley operatively connected to said first side plate;
   a traction element having a cable wire wrapped about said first pulley, said traction element operatively connected to said second side plate, and said traction element adapted to at least partially collapse said hinge when a tractive force is applied to said traction element.

2. The ergonomic device of claim 1, wherein said first pulley is integral with said first side plate.

3. The ergonomic device of claim 1, wherein said first pulley is rotatably mounted to said first side plate.

4. The ergonomic device of claim 1, further comprising a second pulley operatively connected to said second side plate.

5. The ergonomic device of claim 1, wherein said hinge comprises a plurality of hinge portions, each of said plurality of hinge portions having an overall V-shape with a central U-shaped portion.

6. The ergonomic device of claim 1, wherein said first plate and said second side plate each further comprise at least one projection.

7. The ergonomic device of claim 1, wherein said traction element is connected to said first side plate.

8. The ergonomic device of claim 1, further comprising an actuator connected to said traction element.

9. The ergonomic device of claim 8, wherein said actuator further comprises a lever.

10. The ergonomic device of claim 1, wherein said hinge comprises at least one hinge member having an integral portion and a mounting portion.

11. The ergonomic device of claim 10, further comprising a locking fastener to lock in said mounting portion to said first side plate or to said second side plate, wherein said locking fastener is selected from the group consisting of rivets, zip ties, heat stakes and snaps.

12. The ergonomic device of claim 1, wherein said first side plate and said second side plate each comprise a center portion, a top portion, and a bottom portion.

13. The ergonomic device of claim 12, wherein said top portion and said bottom portion are each angled from said center portion.

14. The ergonomic device of claim 1, wherein said first plate further comprises a first rib and said second plate further comprises a second rib.

15. The ergonomic device of claim 14, further comprising a pulley spring connecting said first pulley to said first rib.

16. The ergonomic device of claim 1, further comprising a first end portion outwardly extending from said first side plate, and a second end portion outwardly extending from said second side plate.

17. The ergonomic device of claim 16, wherein said first end portion and said second end portion each further comprise an attachment tab.

18. The ergonomic device of claim 16, wherein said first end portion and said second end portion each further comprise a belt extension.

19. The ergonomic device of claim 18, wherein said belt extension comprises a flexible tab, a tensioning member, and a receiver.

20. A lumbar support for a seat, the seat having a seat back frame, the lumbar support comprising:
a belt, said belt having a first side plate, a second side plate spaced apart from said first side plate, and a hinge extending therebetween, a first pulley operatively connected to said first side plate, a first end portion outwardly extending from said first side plate, and a second end portion outwardly extending from said second side plate, said first end portion and said second end portion each having an attachment tab at its respective terminal end, said attachment tab adapted to connect to the seat back frame; and
a traction element having a cable wire wrapped about said first pulley, said traction element operatively connected to said second side plate, and said traction element adapted to at least partially collapse said hinge when a tractive force is applied to said traction element.

21. The lumbar support of claim 20, further comprising a spinal relief zone located at said hinge.

22. The lumbar support of claim 20, further comprising a support wire interconnecting said attachment tab to the seat back frame.

23. The lumbar support of claim 20, wherein said first end portion and said second end portion each further comprise a belt extension.

24. The lumbar support of claim 20, wherein said traction element is operatively connected to said first side plate.

25. The lumbar support of claim 20, further comprising an actuator connected to said traction element.

26. The lumbar support device of claim 20, further comprising a second pulley operatively connected to said second side plate.

27. The lumbar support of claim 20, wherein said first plate further comprises a first rib and said second plate further comprises a second rib.

28. The lumbar support of claim 27, further comprising a first pulley spring connecting said first pulley to said first rib.

29. An ergonomic device for a seat, comprising:
a belt, said belt having a first side, a second side spaced apart from said first side, a hinge connecting said first side with said second side, and at least one pulley operatively connected to said first side;
a traction element having a cable wire wrapped about said at least one pulley, said traction element operatively connected to said first side and said second side, wherein said traction element moves said belt from a first position in which said hinge is extended to a second position in which said hinge is collapsed; and
an actuator connected to said traction element.

30. The ergonomic support of claim 29, wherein said first side and said second side each comprises an upper portion, a center portion and a lower portion, and wherein said hinge comprises an upper hinge portion connecting said upper portion of said first side with said upper portion of said second side and a lower hinge portion connecting said lower portion of said first side with said lower portion of said second side, and wherein said cable wire connects said center portion of said first side with said center portion of said second side.

31. The ergonomic support of claim 29, wherein said first side of said belt further comprises a first end portion outwardly extending from a first side plate and wherein said second side of said belt further comprises a second end portion outwardly extending from a second side plate.

32. The ergonomic support of claim 31, wherein said first end portion and said second end portion each have an attachment tab at its respective terminal end.

* * * * *